United States Patent [19]

Kayahara et al.

[11] Patent Number: 5,468,292
[45] Date of Patent: Nov. 21, 1995

[54] GROUTING LIQUID FOR INJECTION INTO A GROUND

[75] Inventors: Kenji Kayahara, Kanagawa; Shunsuke Shimada, Tokyo, both of Japan

[73] Assignee: Kyokado Engineering Co., Ltd., Tokyo, Japan

[21] Appl. No.: 264,048

[22] Filed: Jun. 22, 1994

[30] Foreign Application Priority Data

Jun. 28, 1993 [JP] Japan ................................ 5-178570

[51] Int. Cl.$^6$ .................................................... C04B 7/14
[52] U.S. Cl. .......................... 106/789; 106/790; 106/811; 106/816; 106/900; 405/266
[58] Field of Search .................................. 106/789, 790, 106/900, 811, 816; 405/266

[56] References Cited

U.S. PATENT DOCUMENTS

| | | | |
|---|---|---|---|
| 4,266,980 | 5/1981 | Chudo et al. ............................ | 106/900 |
| 4,565,577 | 1/1986 | Burkhardt et al. ...................... | 106/900 |
| 5,026,215 | 6/1991 | Clarke ..................................... | 106/789 |

FOREIGN PATENT DOCUMENTS 0598257  4/1993  Japan .

Primary Examiner—Mark L. Bell
Assistant Examiner—Michael Marcheschi
Attorney, Agent, or Firm—Banner & Allegretti, Ltd.

[57] ABSTRACT

A suspension-type grouting liquid for injection into a ground having excellent penetration properties, e.g. low viscosity and long gelation time, and having comparatively high strength after consolidation. The suspension-type grouting liquid for injection into a ground consists essentially of slag, or a combination of slag and cement, alkali metal aluminates, and water. The slag is a fine grain having specific surface area of 5000 cm$^2$/g or more, and the alkali metal aluminates have a mole ratio of ($\{Me_2O\}/\{Al_2O_3\}$) of 2.8 or more, in which Me means alkali metal, $\{Me_2\}$ and $\{Al_2O_3\}$ represent, respectively, molar concentration of $Me_2$, and $Al_2O_3$.

4 Claims, 1 Drawing Sheet

GROUTING LIQUID FOR INJECTION INTO A GROUND

BACKGROUND OF THE INVENTION

1. Field of the Invention

The present invention relates to a suspension-type grouting liquid for injection into a ground containing, as available ingredients, slag and alkali metal aluminates, and particularly, to such a suspension-type grouting liquid for injection into a ground which is excellent in penetration property, and which shows comparatively, high strength after the consolidation in spite that it shows low viscosity and long gellation time.

2. Description of the Prior Art

It is well known in the past that water glass is gelled with sodium aluminate. But, in this case, the gellation time of the mixture (grout) is very short, for example, it is within one minute. Especially, in summer season, the gellation time of the grout becomes shortened within several to ten second, and thus, the cooling operation of the grout is necessary to elongate the gellation time thereof, or caustic soda must he added into the grout for elongating the gellation time thereof.

But, in this case, the elongation of gellation time should be limited within several minutes for obtaining adequate strength after the consolidation. Of course, if the sodium aluminate to be added into the water glass is within small amounts, then, the gellation time of the grout becomes suddenly longer. But, the strength after the consolidation becomes small, and it does not be reduced in practice. Accordingly, it can be said that the control of the gellation time with the amounts of sodium aluminate is very difficult.

Furthermore, it is known that sodium aluminate is added, as a reactant, into the water glass containing caustic soda thereinto, for obtaining an adequate strength after the consolidation. But, in this case, the grout to be obtained is not stable, since silica is easily deposited from the water glass and thus, the grout is suddenly gelled.

Moreover, it is also known that calcium salts, such as slaked lime, calcium carbonate etc. are added into the water glass having low mol ratio (molar concentration of $SiO_2$/molar concentration of $Na_2O$), or the water glass containing caustic soda thereinto for elongating the gellation time. But, in this case, the solubility of the calcium salts is small, or slight, and thus, the grout to be obtained shows thixotropic property and becomes high viscosity. As a result, the grout to be obtained has such faults that the penetration property thereof is inferior, and the appearance of the strength is slow after the consolidation.

Accordingly, it is an object of the present invention to provide a suspention-type grouting liquid for injection into ground, in which it is excellent in penetration property, and it shows comparatively high strength after the consolidation, in spite that it shows low viscosity, and long gellation time, and in which the disadvantages associated with the above-described prior art are overcome.

SUMMARY OF THE INVENTION

To achieve the above object, according to the present invention, there is provided a grouting liquid for injection into a ground which comprises, as available ingredients, slag and alkali metal aluminates.

In the above-mentioned present invention, said slag can be fine grain having specific surface area of 5000 $cm^2$/g or more, and said alkali metal aluminates can have mol ratio $\{Me_2O\}/\{Al_2O_3\}$ of 2.8 or more, in which Me means alkali metal, $\{Me_2O\}$ and $\{Al_2O_3\}$ represent, respectively, molar concentration of $Me_2O$, and $Al_2O_3$.

DESCRIPTION OF THE PREFERRED EMBODIMENTS

Figure 1:
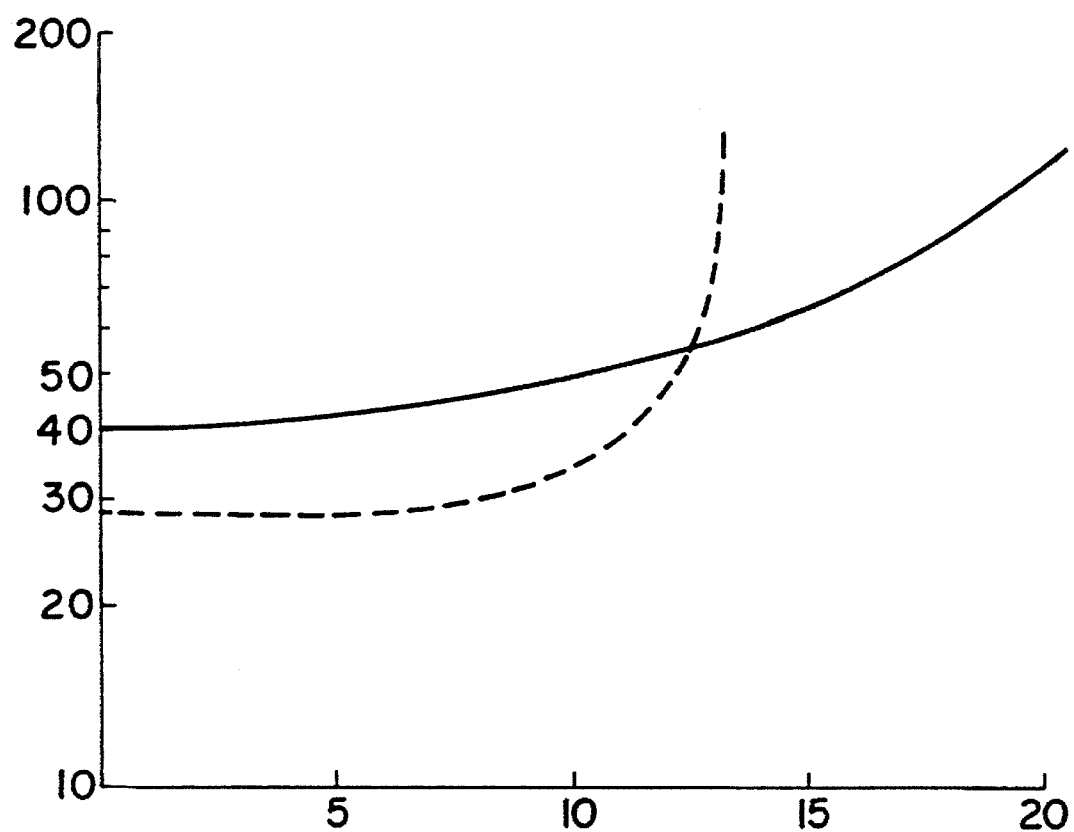
FIG. 1 is a graph illustrating the relationship between a passing time and a funnel viscosity concerning examples Nos. 2 and 4 in Table 3.

The present invention will be described by way of preferred embodiments in connection with the accompanying drawing.

In general, the slag has some different properties from the cement. That is to say that it is not hardened by itself and is hard to be coagulated. On the contrary, however, the present invention has been accomplished by such manners that, the inventor has found the facts that the slag is gradually reacted with alkali metal aluminates and is gelled by and by, and moreover, said gellation is influenced by the mol ratio of alkali metal aluminates and the particle size of the slag.

Moreover, the present invention also, has been accomplished by such manners that the inventor has found the facts that the slag is hardened by alkali metal aluminates, and the mixture of the slag and the alkali metal aluminates is excellent in penetration property.

The sodium aluminate used in the prior grout composed by a combination of water glass-sodium aluminate has, in general, mol ratio (molar concentration of $Na_2O$/molar concentration of $Al_2O_3$) of about 2 or less for obtaining higher strength after the consolidation.

On the contrary, the sodium aluminate used in the prior suspension-type grout composed by a combination of cement-sodium aluminate has higher mol ratio. In this type, the consolidated grout shows higher strength in spite that the grout shows comparatively lower viscosity, and takes long time for the gellation.

The inventor has found that the slag shows the same behavior as the cement in relation to the alkali metal aluminates although it is not hardened by itself and is hard to be coagulated. That is to say, the grouting liquid composed by slag and sodium aluminate having higher mol ratio shows lower viscosity compared with the cement containing grout, takes long time for the gellation, and obtains consolidated grout having higher strength. Especially, said advantages can be remarkably increased by keeping the mol ratio of alkali metal aluminates to 2.8 or more, and keeping the slag to fine grain having specific surface area 5000 $cm_2$/g or more with pulverization.

The functions of the present invention are considered as follows.

When the $Me_2O$ concentration of alkali metal aluminates is higher, the silica in the slag is solubilized with the act of ampholyte of aluminum. The solubilized silica is reacted with calcium in the slag and aluminum in the alkali metal aluminates to form colloid consisting of silica-alumina-calcium. The slag particles are packed in the colloid, and as a result, the grouting liquid is totally consolidated. Accordingly, said functions will be remarkably appeared especially when the slag is finely grained, and the mol ratio of alkali metal aluminates is high.

The present invention will now be described in more detail by way of examples, but is not limited by these examples.

1. Material used
   (1) Slag

There are two kinds of slag. One is silicate-type slag and other is non-silicate-type slag. The most popular slag is silicate-type slag produced from a blast furnace for iron making, having the following components.

Density: 3.2,
$SiO_2$: 36.6%
CaO: 43.2%,
$Al_2O_3$: 11.0%,
others (MgO, FeO etc.)

In these examples, several kinds of said silicate-type slag, each having different particle sizes by grinding, were used as shown in Table 1.

TABLE 1

| slag | specific surface area ($cm^2/g$) |
| --- | --- |
| (1) | 5800 |
| (2) | 5100 |
| (3) | 4200 |
| (4) | 2800 not grinding |

(2) Alkali metal aluminates 5 kinds of sodium aluminate shown in Table 2 were respectively used in these examples.

TABLE 2

| liquid of sodium aluminate | density (20° C.) | $Al_2O_3$ (%) | $Na_2O$ (%) | mol ratio |
| --- | --- | --- | --- | --- |
| (1) | 1.48 | 14.93 | 21.13 | 2.33 |
| (2) | 1.39 | 12.05 | 21.41 | 2.92 |
| (3) | 1.32 | 7.17 | 21.59 | 4.95 |
| (4) | 1.30 | 3.60 | 22.00 | 10.05 |
| (5) | 1.28 | 1.59 | 22.28 | 23.05 |

(3) Cement

The most popular portland cement with fine grain, having 5000 $cm^2/g$ of specific surface area, was used i n the examples.

2. The grouts consisting of a mixture of slag and sodium aluminate

The components shown in Table 3 were blended to obtain the examples. Also, the examples were tested and determined as to gelation time, the consolidation rate and the unconfined compressive strength of consolidated grout. The results were shown in Table 3.

TABLE 3

| example No. | blending | | | | | | gelation time (hrs.) | consolidation rate (%) | unconfined compressive strength of consolidated grout ($kgf/cm^2$) | | |
| --- | --- | --- | --- | --- | --- | --- | --- | --- | --- | --- | --- |
| | slag | | sodium aluminate liquid | | | water (ml) | | | impregnation days in water (numbers of days) | | |
| | No. in Table 1 | amount (g) | No. in Table 2 | amount (g) | mol ratio | | | | 2 | 10 | 30 |
| 1 | (1) | 300 | (5) | 100 | 23.05 | 600 | about 11 | 97 | 13.0 | 28.5 | 32.1 |
| 2 | (2) | " | " | " | " | " | about 13 | 96 | 12.7 | 28.1 | 31.3 |
| 3 | (3) | " | " | " | " | " | about 15 | 85 | 11.4 | 25.7 | 29.9 |
| 4 | (4) | " | " | " | " | " | about 19 | 74 | 11.0 | 25.5 | 29.0 |
| 5 | (2) | " | (1) | " | 2.33 | " | 0.5 | 97 | 6.1 | 9.8 | 12.6 |
| 6 | " | " | (2) | " | 2.92 | " | 1 | 97 | 8.8 | 19.1 | 23.3 |
| 7 | " | " | (3) | " | 4.95 | " | about 4 | 97 | 11.1 | 24.2 | 27.7 |
| 8 | " | " | (4) | " | 10.05 | " | about 8 | 96 | 12.5 | 27.0 | 30.1 |

(Temp. 20 ± 1° C.)

It is shown from Table 3 that all examples on Table 3 of the present invention show ten several $kgf/cm^2$ of unconfined compressive strength after the consolidation. Especially, examples 1 to 4 and 6 to 8, each, having 2.8 or more of mol ratio of sodium aluminate show 20 to 30 or more $kgf/cm^2$ of unconfined compressive strength after the consolidation, which are very high compared with example 5 having mol ratio of less than 2.8. Moreover, all of these examples show 30 minutes or more of gelation time, and especially, examples 1 to 4 and 6 to 8 show longer gelation time. This means that the penetration time of each of the examples is long, and accordingly, it can be said that each of the examples is excellent in penetration property.

FIG. 1 is a graph which shows relationship between passing time and viscosity (funnel viscosity: second) concerning examples 2 and 4 (using slag without grinding). The following facts are known from FIG. 1. Example 2 continues to keep low viscosity and suddenly shows high viscosity just before the gellation, compared with example 4. On the other hand, example 4 shows comparatively high viscosity at the blending point, and to continue gradual increase of the viscosity along with the passing time until the gellation.

Moreover, all of examples 1 to 4, which are composed by mixing sodium aluminate having high mol ratio (No. 5 on Table 2), and different kinds of slag, each having different particle size (Nos. 1 to 4 on Table 1), are excellent in strength after the consolidation, which are about 30 $kgf/cm^2$ of unconfined compressive strength. But, concerning example 4 using non-grinding slag, and example 3 using slag having $4200cm^2/g$ of specific surface area, the consolidation rates are below 90% since the slag in these examples are gradually deposited after long time.

On the other hand, in examples 1 and 2, each having more than 5000 $kgf/cm^2$ of specific surface area of slag, the deposition of clay is scarcely occured, and thus, the consolidation rate shows almost 100%. As mentioned above, when the slag is finely grained, especially, when the specific surface area thereof is 5000 $kgf/cm^2$ or more and the mol ratio of sodium aluminate is 2.8 or more, the examples are strongly consolidated, and the consolidation rates thereof are suddenly increased. Moreover, they continue to keep low viscosity, and thus, are excellent in penetration property.

3. Combination with cement

The combination of slag and cement was used instead of the slag of the present invention, as mentioned in Table 4. With these samples, the tests were carried out and the results thereof were shown in Table 4.

TABLE 4

| example No. | slag of No. 2 in Table 1 (g) | cement (g) | liquid of sodium aluminate of No. 5 in Table 2 (g) | water (ml) | gelation time (hrs.) | consolidation rate (%) | unconfined compressive strength of consolidated grout (kgf/cm$^2$) impregnation days in water (numbers of days) | | |
|---|---|---|---|---|---|---|---|---|---|
| | | | | | | | 2 | 10 | 30 |
| 9 | 300 | — | 100 | 600 | about 13 | 96–97 | 12.7 | 28.1 | 31.3 |
| 10 | 250 | 80 | 90 | " | about 11~12 | " | 13.8 | 28.7 | 31.0 |
| 11 | 200 | 150 | 80 | " | " | " | 14.0 | 29.2 | 32.0 |
| 12 | 150 | 230 | 70 | " | " | " | 13.3 | 28.9 | 31.1 |

(Temp. 20 ± 1° C.)

As shown in Table 4, when both of the slag and cement are fine grain, and when sodium aluminate has high mol ratio, the samples show good results after the gellation with being scarcely influenced by the amounts of the slag and cement.

The effects of the present grouting liquid comprising slag and alkali metal aluminates are as follows.

1. The slag is not consolidated by itself. But, when it is mixed with alkali metal aluminates, the mixture continues to keep low viscosity for long time, and thereafter, is suddenly gelled.
2. Thus, the mixture shows low viscosity and long gellation time, and as a result, it can be said that it is excellent in penetration property.
3. Moreover, the mixture shows high strength after the consolidation almost same as the strength of cement.
4. When the alkali metal aluminates having 2.8 or more of mol ratio, and the fine-grained slag having 5000 cm$^2$/g or more of specific surface area are used in the mixture, the afore-mentioned effects are remarkably increased.

What is claimed is:

1. A grouting liquid for injection into a ground consisting of slag or a combination of slag and cement, an alkali metal aluminate, and water, said slag being fine grain having a specific surface area of 5000 cm$^2$/g or more, and said alkali metal aluminate having a mole ratio ($\{Me_2O\}/\{Al_2O_3\}$) of 2.8 or more, in which Me is an alkali metal, and $\{Me_2O\}$ and $\{Al_2O_3\}$ represent molar concentration of $Me_2O$, and $Al_2O_3$, respectively.

2. The grouting liquid as claimed in claim 1 wherein said slag is a silicate slag.

3. The grouting liquid as claimed in claim 1 consisting of said combination of slag and cement, said alkali metal aluminate and water, said cement being fine grain cement having a specific surface area of 5000 cm$^2$/g.

4. The grouting liquid as claimed in claim 1 wherein said alkali metal aluminate is sodium aluminate.

* * * * *